W. S. ADAMS.
FLOAT INDICATING DEVICE.
APPLICATION FILED FEB. 8, 1917.
1,272,882.
Patented July 16, 1918.
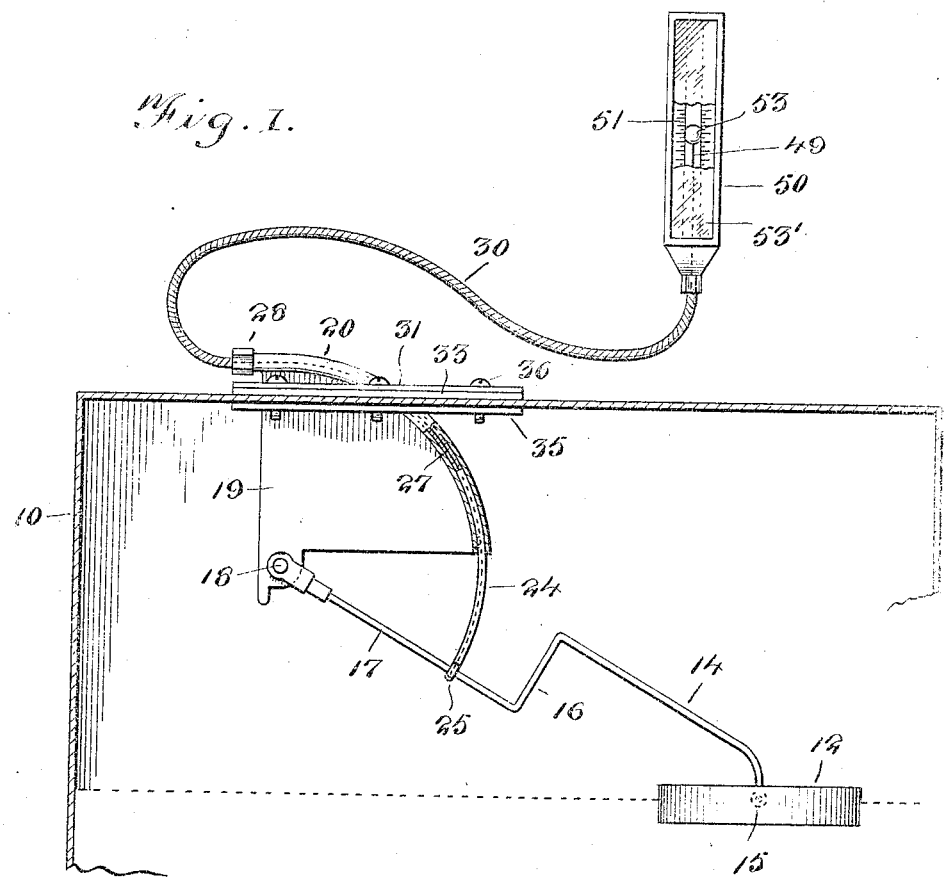
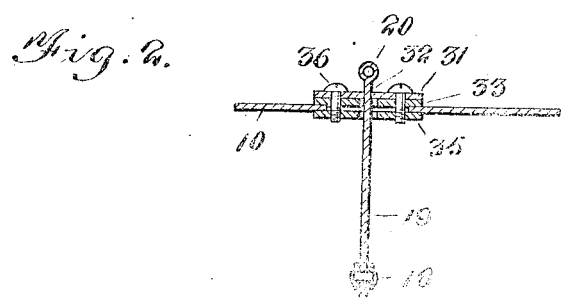
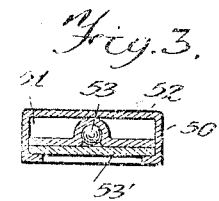
WITNESS
INVENTOR
W. S. Adams
Victor J. Evans
ATTORNEY

UNITED STATES PATENT OFFICE.

WILLIAM S. ADAMS, OF RIVERTON, WYOMING, ASSIGNOR OF ONE-HALF TO CLIFFORD M. COLE, OF CHICAGO, ILLINOIS.

FLOAT INDICATING DEVICE.

1,272,382.    Specification of Letters Patent.    Patented July 16, 1918.

Application filed February 8, 1917. Serial No. 147,459.

*To all whom it may concern:*

Be it known that I, WILLIAM S. ADAMS, a citizen of the United States, residing at Riverton, in the county of Fremont and State of Wyoming, have invented new and useful Improvements in Float Indicating Devices, of which the following is a specification.

This invention relates to float indicating devices for gasolene tanks or the like, and it consists in providing certain novel means for connecting the float with the indicating device, and certain novel means mounted on one wall of the tank for supporting and guiding the connecting means, and limiting the movement of the float.

In the accompanying drawings, forming part of this specification:—

Figure 1 is a view partly in elevation and partly in section showing the construction of the device.

Fig. 2 shows details of the means for connecting the movable elements with the upper wall of a tank or receptacle.

Fig. 3 is a detail in section of the indicating device.

Referring to the drawings in detail, the tank is designated 10 and may be of any preferred form, the float operating therein being shown at 12. This float may be of metal or cork or other material. A lever arm 14 is pivotally connected at 15 with the float and may comprise a substantially straight portion at the side adjacent to the float, an inclined portion 16 and a second straight portion 17 pivoted at 18 to a stationary plate-like member 19 secured to one of the walls of the tank, usually the upper wall thereof. I do not of course limit myself to the formation of the arm or lever connecting the float and serving to operate the indicator.

Plate member 19 is provided with an integral tubular portion 20 along its curved edge, the plate itself being substantially in the form of a quadrant although not necessarily that form. The tubular member 20 serves as a guide for an inner tube 24 mounted at 25 on arm 17 and rigidly connected therewith. Within the inner tube is a wire 27 which is also rigidly connected with the arm 17 of the lever. This wire passes through the inner tube and a portion thereof passes through the outer tube 20 and extends from the end thereof at a point adjacent the number 28 where it enters a connecting tube leading to an indicating device. This tube is designated 30 and it may be of flexible material and formed of coiled wire, or if preferred, it may be a rigid tube. Under certain conditions the rigid tube is desired or may be necessary. If the tube is of flexible material it may be of drawn metal.

Plate member 19 is rigidly connected with the upper or side wall of the tank in any suitable manner. In the drawings, I have shown an upper plate 31 provided with a slot 32 through which plate member 19 and member 20 project. The elements are rigidly secured within the slot by means of solder or otherwise. Plate 31 rests on the upper wall of the tank, a gasket 33 however being inserted between the plate and the upper wall of said tank. A plate 35 is slotted longitudinally for the accommodation of plate 19 and is positioned below the upper wall of the tank, plates 31 and 35 being connected by means of screws 36 or otherwise. It is to be understood that I do not limit myself to any particular means for mounting the elements on the wall of the tank.

The indicating device which may be employed in connection with any one of these forms may comprise an outer casing 50 inclosing a metallic plate 51, the central portion 52 of which is bent into concave form in order to provide a substantially tubular construction for guiding the end of the wire 49, and an indicating device proper designated 53, and consisting of a colored bead or any suitable device. The surface of plate 51 or a portion thereof, is covered by a transparent plate 53' of glass, celluloid or the like, through which the position of the indicating device may be observed. The graduations appear on plate 51, on the transparent material 53', or a separate card properly secured.

I claim:—

In a device of the class described, a plate member provided with an opening therein, a corresponding plate member having an opening therein, a plate member of segmental formation passing through each of the aforesaid openings and secured to one of the plate members, the segmental member having a tubular portion formed along the curved edge thereof, and being provided with an offset portion at the inner angular portion of the segment, and with a projecting member constituting a stop on said offset, a pivotally mounted arm connected with the offset portion, a float, and means for pivoting said arm to the float, a flexible member connected with the arm at a point between its pivotal connection with the segment and with the float, and an indicating device connected to the flexible member.

In testimony whereof I affix my signature.

WILLIAM S. ADAMS.